(12) United States Patent
Qiu

(10) Patent No.: US 12,727,658 B1
(45) Date of Patent: Sep. 8, 2026

(54) PROTECTIVE DEVICE FOR WIRELESS POSITIONING EQUIPMENT

(71) Applicant: Hangzhou Xiyang E-commerce Co., Ltd., Zhejiang (CN)

(72) Inventor: Shanlin Qiu, Zhejiang (CN)

(73) Assignee: Hangzhou Xiyang E-commerce Co., Ltd., Zhejiang (CN)

( * ) Notice: Subject to any disclaimer, the term of this patent is extended or adjusted under 35 U.S.C. 154(b) by 0 days.

(21) Appl. No.: 19/365,499

(22) Filed: Oct. 22, 2025

(30) Foreign Application Priority Data

Sep. 30, 2025 (CN) ........................ 202522119756.4

(51) Int. Cl.

*H04B 1/00* (2006.01)
*A45F 5/00* (2006.01)
*H04B 1/3888* (2015.01)

(52) U.S. Cl.

CPC ......... *A45F 5/1516* (2025.01); *H04B 1/3888* (2013.01)

(58) Field of Classification Search

CPC ........................... A45F 5/1516; H04B 1/3888
See application file for complete search history.

(56) References Cited

U.S. PATENT DOCUMENTS 11,612,226 B1 * 3/2023 Hunter .................. A45C 13/18 206/37
2022/0391656 A1 * 12/2022 Chen ..................... A45C 11/00

OTHER PUBLICATIONS

Woylinger (Genuine Leather for AirTag Holder Keychain for AirTag—Premium Handmade Protective Case Cover Accessories with Key Ring, Secure Hidden Design, All-in-One Package, https://a.co/d/1QEhp45, Oct. 18, 2024; pp. 1-7). (Year: 2024).*

* cited by examiner

*Primary Examiner* — Ping Y Hsieh
(74) *Attorney, Agent, or Firm* — Hawaii Patent Services; Nathaniel K. Fedde; Kenton N. Fedde

(57) ABSTRACT

The present disclosure relates to a protective device for wireless positioning equipment, comprising a holding component and a locking assembly. The holding component forms an enclosed accommodating cavity to hold the wireless positioning equipment; the locking assembly is disposed adjacent to the opening of the holding component to reliably close the opening and prevent the wireless positioning equipment from disengaging.

19 Claims, 14 Drawing Sheets

PROTECTIVE DEVICE FOR WIRELESS POSITIONING EQUIPMENT

CROSS-REFERENCE TO RELATED APPLICATIONS

This application claims priority to Chinese Utility Model application No. 202522119756.4, titled "Protective Device for Wireless Positioning Equipment," filed on Sep. 30, 2025, the content of which, including amendments thereof, is incorporated herein by reference in its entirety.

TECHNICAL FIELD

The present disclosure relates to the technical field of positioning equipment, particularly to a protective device for wireless positioning equipment.

BACKGROUND

With the development of IoT technology, wireless positioning equipment such as Bluetooth beacons and GPS trackers are widely used in scenarios like item tracking and personnel monitoring. Their fixation often relies on magnetic or adhesive methods, which have significant drawbacks: magnetic fixation is prone to disconnection due to bumps, vibrations, or interference from other metal parts, leading to device detachment and unprotected core components being easily damaged by scraping; adhesive fixation temporarily avoids detachment issues but suffers from weakening adhesion over time, leaves residue when removed, damages surfaces, and similarly lacks device protection. Some simple protective cases still require magnetic or adhesive fixation, failing to address the core issues, and also suffer from inconvenient handling and a lack of anti-detachment design.

SUMMARY

The present disclosure provides a protective device for wireless positioning equipment to solve the problems mentioned in the background.

To achieve the above object of the present disclosure, the present disclosure adopts the following technical solutions:

A protective device for wireless positioning equipment comprises a holding component, comprising a first base part and a second base part, wherein part of edges of the first base part and the second base part is interconnected to jointly form an accommodating cavity for holding wireless positioning equipment, and unconnected part of the edges of the first base part and the second base part forms an opening leading to the accommodating cavity; and a locking assembly operatively disposed adjacent to the opening and switchable between a locked state and an unlocked state, wherein in the locked state, the locking assembly prevents the positioning equipment from disengaging from the accommodating cavity.

The beneficial effects of the present disclosure compared to the prior art are as follows:

The holding component forms an enclosed accommodating cavity through the stitching of the first and second base parts and the design of the joining part, providing a stable housing space for the wireless positioning equipment. In the locking assembly, a linear loop strap leverages the contraction properties of elastic and wear-resistant materials to achieve "easy installation/removal+uniform circumferential clamping" for closing the opening, adapting to efficient daily operations. The herringbone fastener, through "horizontal clamping slot limitation of the first/second engaging arms+circumferential sleeve clamping of the connecting seat," forms a multi-dimensional constraint mechanism, disperses external loads, significantly enhances the reliability of opening closure in complex scenarios, and effectively prevents the positioning equipment from escaping through the opening.

BRIEF DESCRIPTION OF DRAWINGS

The drawings, which form part of this application, are intended to provide further understanding of the present disclosure. The illustrative embodiments and the descriptions thereof are used to explain the present disclosure and do not constitute undue limitations. In the drawings.

Figure 1:
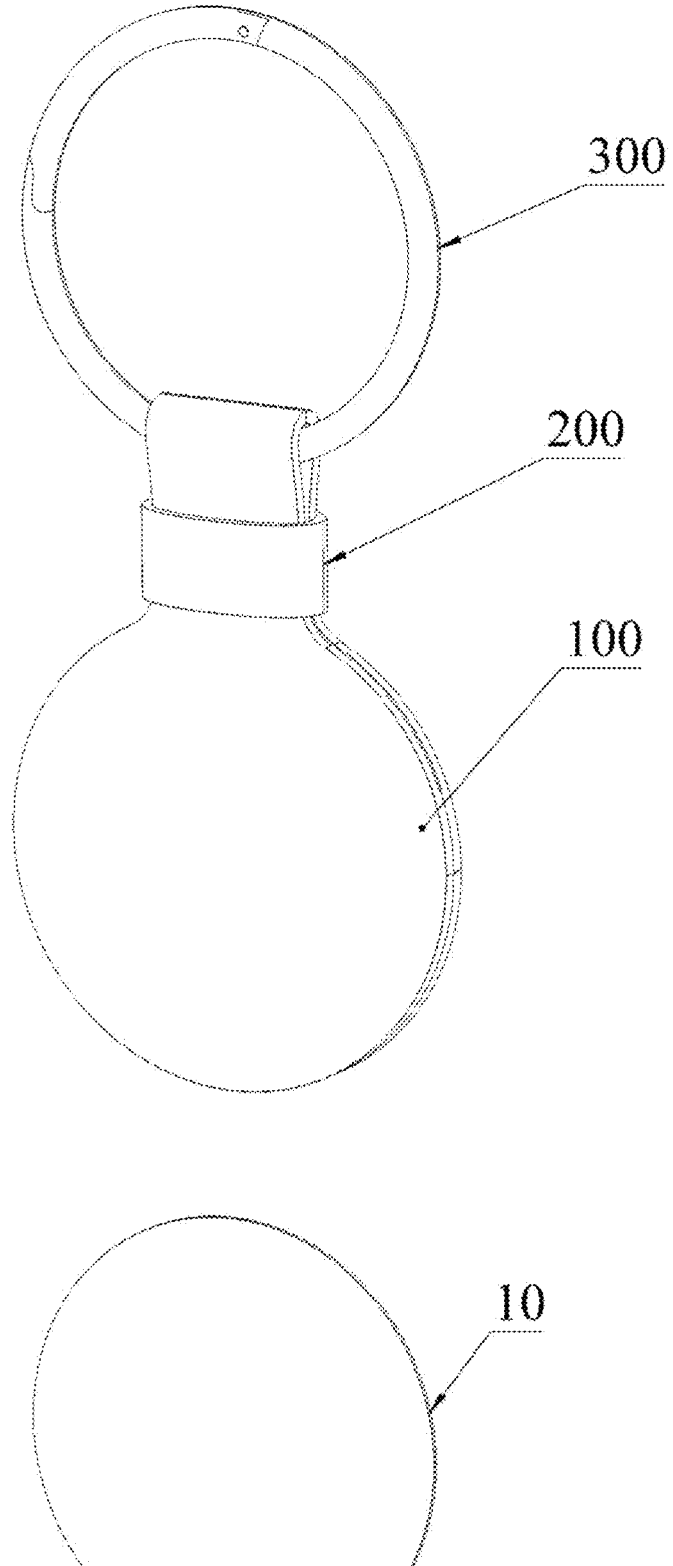
FIG. 1 is a perspective schematic view of an embodiment provided by the present disclosure.
Figure 2:
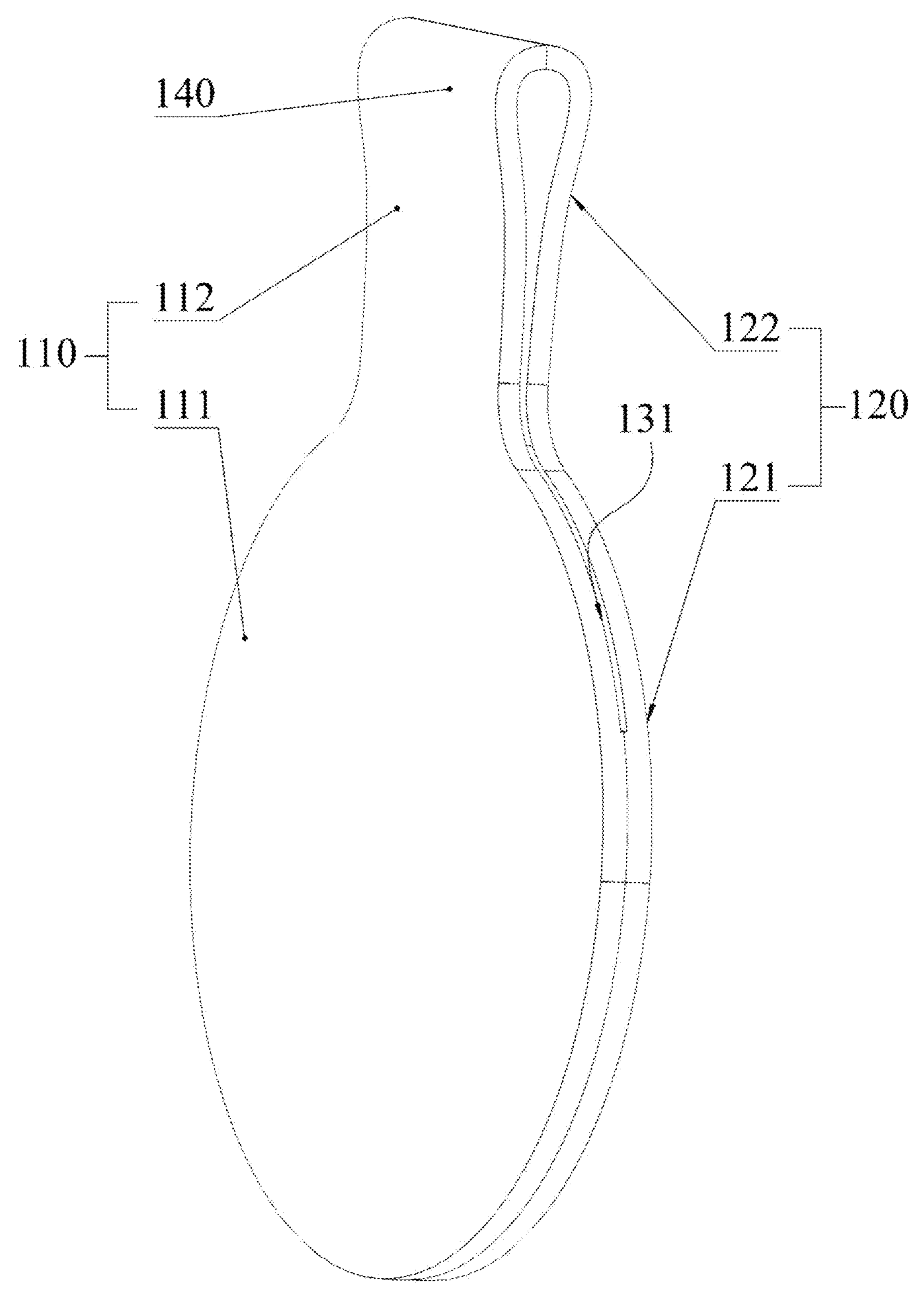
FIG. 2 is a structural schematic view of the holding component in the embodiment of FIG. 1.
Figure 3:
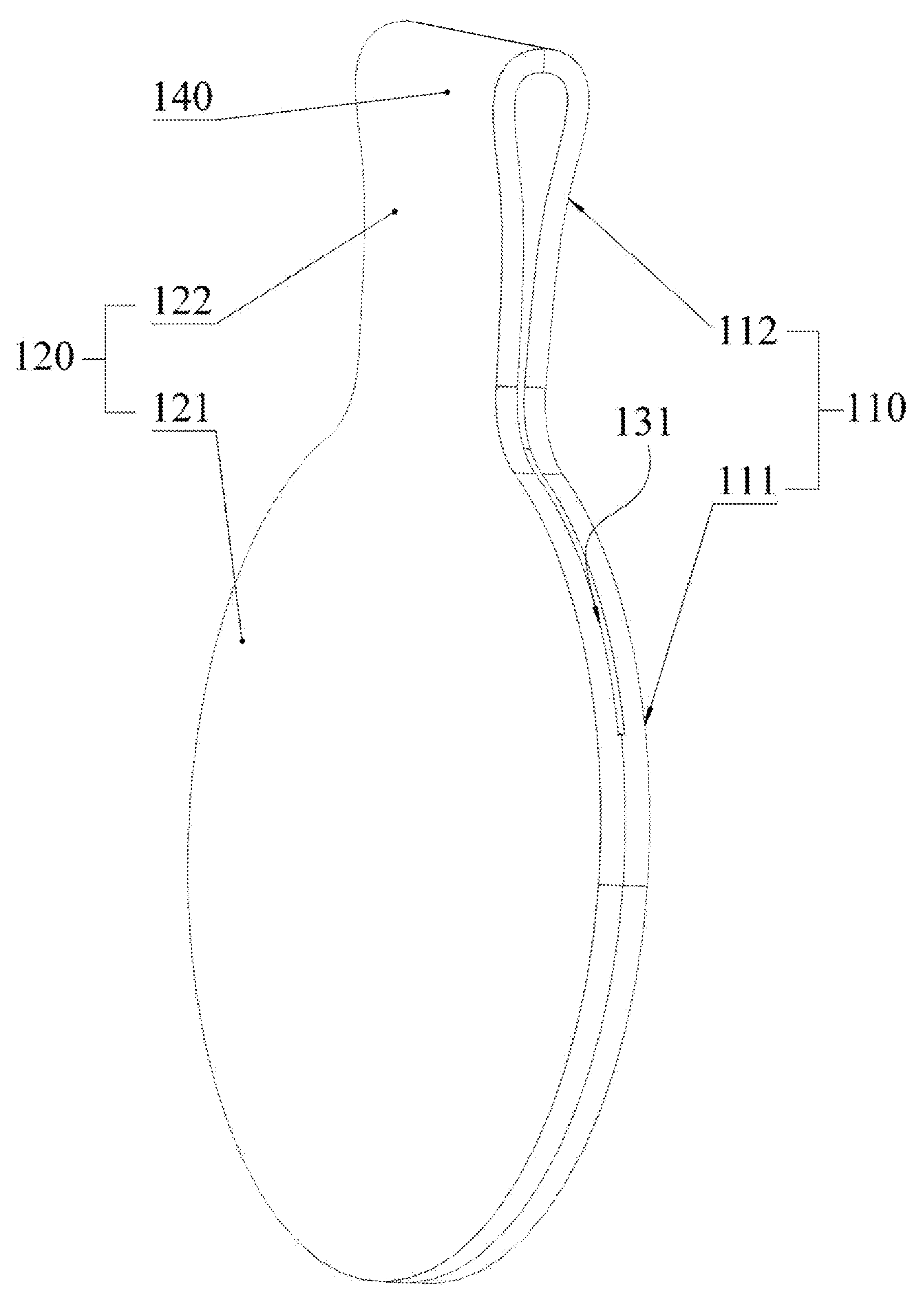
FIG. 3 is another perspective schematic view of the embodiment shown in FIG. 2.
Figure 4:
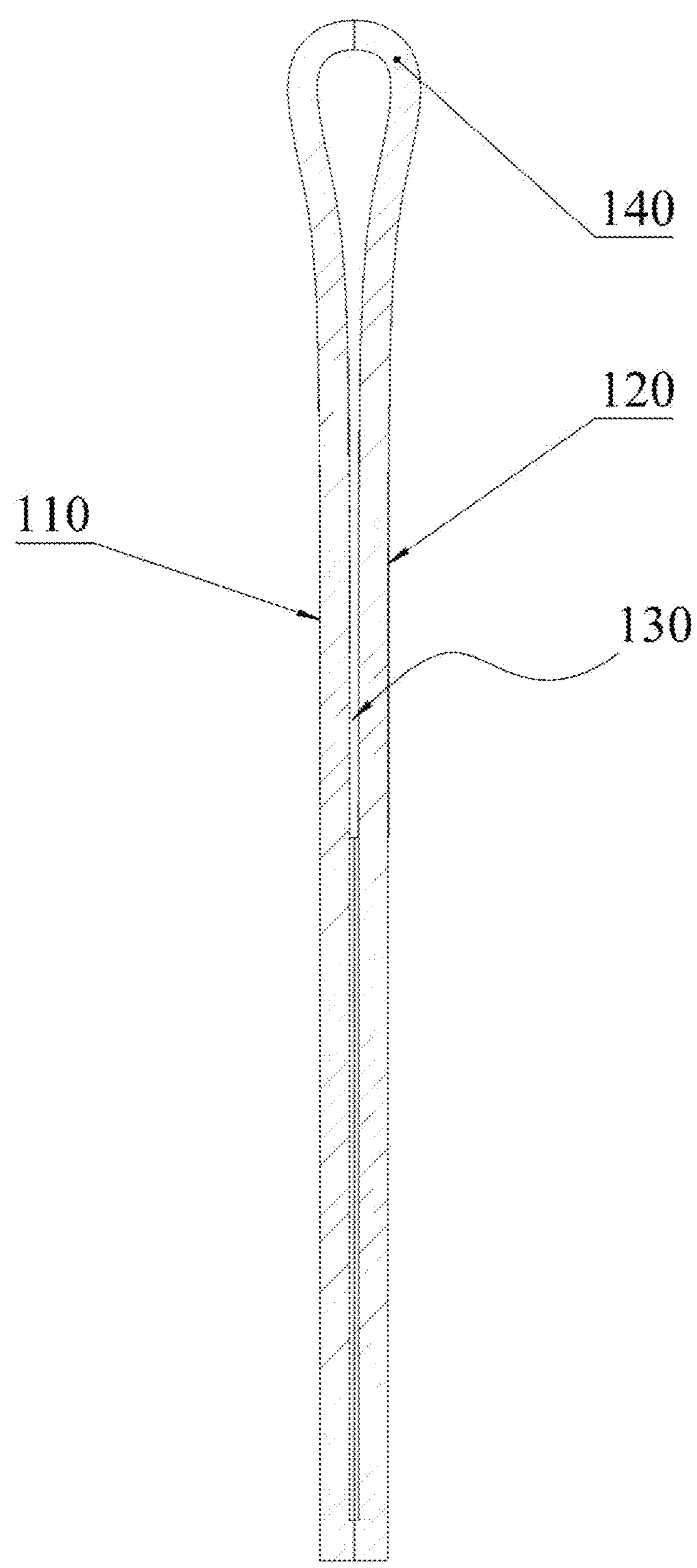
FIG. 4 is a cross-sectional view of the embodiment shown in FIG. 2.

Reference signs: Wireless Positioning Equipment (10); Holding Component (100); First Base Part (110); First Holding Part (111); First Connecting Part (112); Second Base Part (120); Second Holding Part (121); Second Connecting Part (122); Accommodating Cavity (130); Opening (131); Joining Part (140); Through Hole (150); Locking Assembly (200); Connecting Seat (210); Fastener (220); First Engaging Arm (221); Second Engaging Arm (222); First Clamping Slot (2211); Second Clamping Slot (2221); Connecting Shaft (230); Locking Latch (240); Hanging Assembly (300); Fixed Segment (310); Movable Segment (320); Locking Mechanism (330); Hinge Shaft (331); Torsion Spring (332); Locking Recess (311); Locking Protrusion (321); Limiting Portion (340).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms “comprising” and/or “including” are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

In the present disclosure, addressing the issue where existing wireless positioning equipment is often fixed using magnetic or adhesive methods—magnetic fixation being prone to detachment and damage due to bumps or vibrations, and adhesive fixation suffering from weakened adhesion over time and leaving residue that damages surfaces upon removal—both lacking reliable protection. A protective device for wireless positioning equipment is provided. This device features a collaborative structure including a holding component, a locking assembly, and a hanging assembly. The holding component forms a closed accommodating cavity to hold the wireless positioning equipment, the locking assembly ensures secure closure and anti-detachment of the opening, and the hanging assembly achieves stable suspension of the device and axial positioning of the locking assembly. Below, the specific embodiments of the protective device for wireless positioning equipment according to the present disclosure are described in detail with reference to the accompanying drawings.

As shown in FIGS. 1, 2, 3, and 4, the present disclosure provides a protective device for wireless positioning equipment, including a holding component 100 and a locking assembly 200. The holding component 100 includes a first base part 110 and a second base part 120. The first base part 110 includes a first holding part 111 and a first connecting part 112, while the second base part 120 includes a second holding part 121 and a second connecting part 122. Here, the first holding part 111 and the second holding part 121 are configured as plate-like structures mirror-symmetrical to each other, preferably circular in this disclosure. Part of edges of the first holding part 111 and the second holding part 121 are stitched together, with the middle portions thereof enclosing to form a closed accommodating cavity 130 for housing the wireless positioning equipment 10. In other embodiments, the contours of the first holding part 111 and the second holding part 121 may be expanded to oval, rounded rectangle, or other smooth geometric shapes suitable for accommodating the wireless positioning equipment 10. Their fixation method can also be replaced by alternatives such as heat-sealing welding, adhesive bonding, or snap-fit connections.

In other embodiments (not shown), the holding component 100 may be equipped with a removable liner module inside the accommodating cavity 130. The liner module consists of multiple elastic gaskets, each fixed to the inner wall of the accommodating cavity 130 via snaps or hook-and-loop fasteners. When installing wireless positioning equipment 10 of different diameters or shapes, the effective volume and clamping force within the cavity can be adjusted by adding, removing, or replacing gaskets, thereby achieving precise matching and cushioning protection for different models of devices without altering the external shape of the holding component 100. The liner module is preferably made of anti-slip material and features guiding protrusions to facilitate device positioning and enhance shock resistance.

The unstitched edges of the first holding part 111 and the second holding part 121 form an opening 131, allowing the wireless positioning equipment 10 to be placed into the accommodating cavity 130 through this opening. The first connecting part 112 and the second connecting part 122 are configured as sheet-like structures extending vertically upward from the edges of the first holding part 111 and the second holding part 121 along the opening 131. In the preferred embodiment, the first connecting part 112 and the second connecting part 122 are rectangular, while in other embodiments, they may adopt any shape such as circular, oval, or diamond. The first connecting part 112 and the second connecting part 122 are integrally and fixedly connected at one end to form a roughly U-shaped joining part 140, which controls the opening and closing of the opening 131. In this disclosure, “vertically upward” refers to the direction opposite to gravity. Specifically, when the wireless positioning equipment 10 is stably placed within the accommodating cavity 130 formed by the first holding part 111 and the second holding part 121 due to its own gravity, the direction of the opening 131 is defined as “upward,” and the direction opposite to gravity is “vertically upward.” In other words, “extending vertically upward along the opening 131” means that the first connecting part 112 and the second connecting part 122 extend roughly in the direction opposite to gravity from the edge of the opening.

Figure 10:
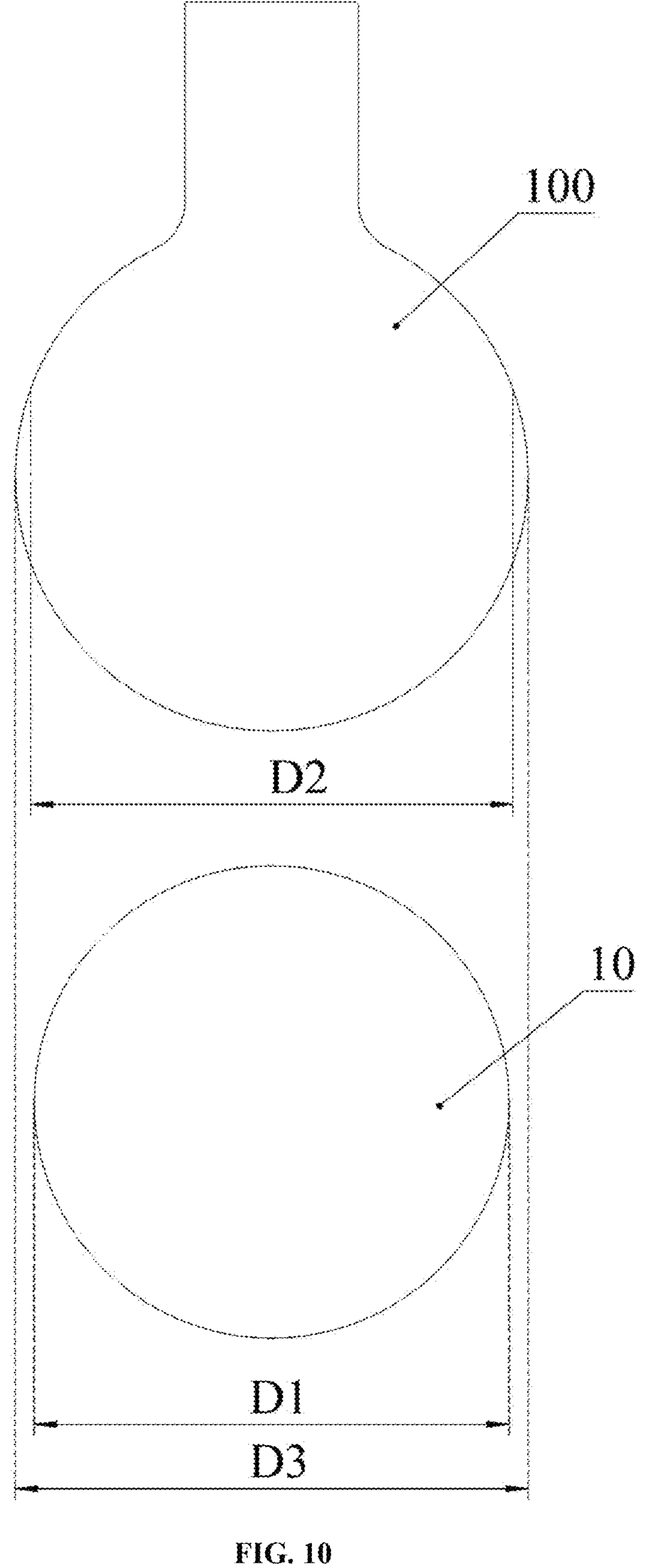
FIG. 10 is a front view of the holding component and wireless positioning equipment of the embodiment shown in FIG. 1.

It should be noted that, as shown in FIG. 10, the distance between the two outer end points of the opening 131 (refer to FIG. 2) satisfies the following conditions: 20% of the diameter D1 of the wireless positioning equipment 10 is less than the distance D2 between the two outer end points of the opening 131, and the distance D2 between the two outer end points of the opening 131 is less than the maximum linear dimension D3 of the first base part 110 and the second base part 120. This maximum linear dimension D3 is defined as the maximum measurable dimension on the planar projection contour of the holding component 100 after the first holding part 111 and the second holding part 121 are joined. In the circular embodiment shown in FIG. 10, this maximum linear dimension D3 is the diameter of the holding component 100. The materials of the first holding part 111 and the second holding part 121 in the holding component 100 are preferably flexible materials (e.g., thermoplastic polyurethane TPU, silicone). In other embodiments, materials such as polyester elastomers (TPE), nylon elastomers, or composites of flexible fabric and elastic rubber layers with elastic deformation capabilities may also be used. The first base part 110 and the second base part 120 are configured to undergo elastic deformation under external force. When installing the wireless positioning equipment 10, the external force can directly act on the edges of the first base part or the second base part, causing the opening 131 to expand and allowing the device to be placed into the accommodating cavity 130 (refer to FIG. 4). After the external force is removed, the resilience of the flexible material causes the first base part 110 and the second base part 120 to at least partially return to their original state, helping to reduce the expansion of the opening 131. This, combined with the subsequent sealing action of the locking assembly 200, further enhances the sealing reliability of the accommodating cavity 130.

In other embodiments (not shown), the first holding part 111 and the second holding part 121 of the holding component 100 may adopt a three-layer composite material structure, arranged from the inside out as follows: the inner layer is a 0.2-0.3 mm thick food-grade silicone layer, featuring anti-slip and anti-scratch properties to prevent surface wear of the equipment; the middle layer is a 0.5 mm thick aramid fiber woven layer, leveraging the high strength and tear resistance of aramid fibers to enhance the tensile and impact resistance of the holding part, making it suitable for long-term use in complex outdoor environments; the outer layer is a 0.3 mm thick TPU film layer, offering waterproof and oil-resistant functions, allowing for direct wiping and cleaning. The three layers are integrally formed through a thermal fusion process, preserving the elastic deformation capability of flexible materials while compensating for the strength deficiency of traditional single materials through the middle aramid fiber layer. This effectively cushions impact forces in case of accidental drops, further protecting the internal electronic components of the wireless positioning equipment 10.

In other embodiments (not shown), to accommodate wireless positioning equipment of different diameters, adjustable limiters may be added to the opening edges of the first connecting part 112 and the second connecting part 122. Specifically, sliding wedges or adjustment reeds with gear slots are used, allowing users to preset damping and effective opening width along the opening direction during installation, with the position locked by mechanical bumps or snaps after reset. This structure enables presetting the size of the opening 131 and the elastic rebound amount without altering the overall shape of the accommodating cavity 130, improving compatibility with multi-sized positioning equipment while providing additional geometric limits when pulled by external forces, reducing the risk of excessive opening.

In other embodiments (not shown), a slender rigid or semi-rigid frame (e.g., a wire frame or fiberglass-reinforced plastic strip) is embedded around the perimeter of the holding component 100. The frame is arranged circumferentially along the edges of the first holding part 111 and the second holding part 121 or looped around the joining part 140, providing localized structural stiffness while maintaining a flexible appearance. This frame effectively disperses stress when subjected to impact or compression, preventing accidental opening of the opening 131 due to localized deformation of the accommodating cavity 130. Additionally, the elastic rebound of the frame synergizes with that of the flexible material, improving handling during installation and the reset stability of the positioning equipment.

In other embodiments (not shown), to improve adaptability to outdoor environments, a sealing ring (such as a compression-type rubber ring or a flush-mounted elastic pad with the same color) can be introduced at the edge of the accommodating cavity 130 and the opening 131, while microporous breathable valves or one-way exhaust membranes are locally installed in the cavity (to prevent rainwater ingress while allowing internal moisture to gradually escape). The combined action of the sealing ring and breathable valves reduces the risk of moisture exposure for the wireless positioning equipment during heavy rain or humid conditions, while avoiding humidity buildup inside the cavity due to complete sealing, thereby extending the lifespan of internal electronic components.

In other embodiments (not shown), the outer surface of the holding component 100 is equipped with transparent panes or replaceable label slots for placing reflective materials, safety tags, QR codes, or contact information. The reflective materials enhance nighttime visibility, while QR codes or information labels facilitate contact for return if the device is lost and found, improving the human-device interaction and public safety features of the device.

Figure 5:
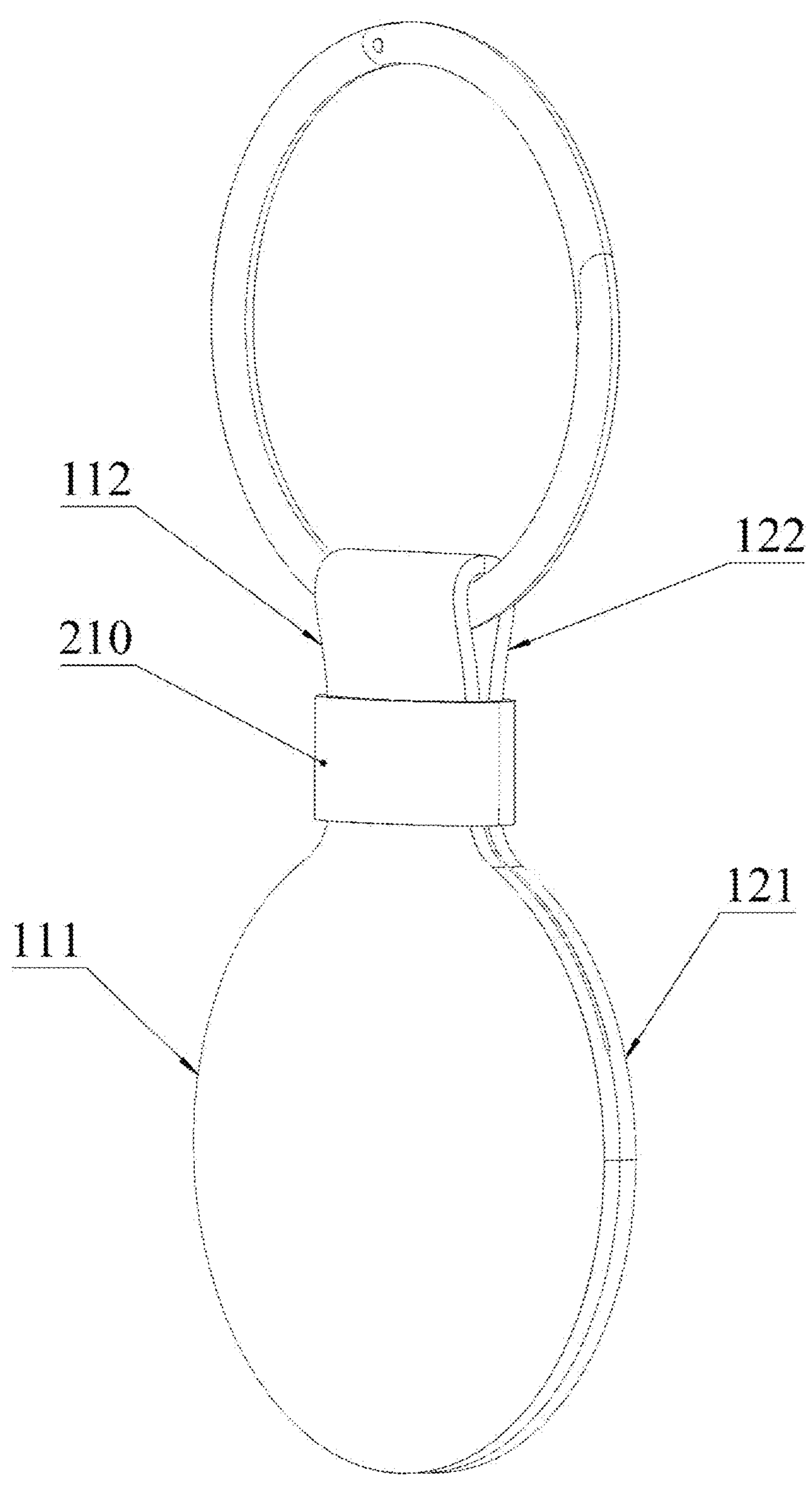
FIG. 5 is another perspective schematic view of the embodiment shown in FIG. 1.

As shown in FIG. 5, in the preferred embodiment of the present disclosure, the locking assembly 200 includes a connecting seat 210, configured as a straight-line annular strap. The connecting seat 210 is made of elastic and wear-resistant material (such as silicone-modified nylon webbing), with its inner ring size matching the peripheral contour of the joining part 140. The outer diameter of the connecting seat 210 is less than the maximum outer diameter of the holding component 100, preventing the connecting seat 210 from detaching from the holding component 100. The locking assembly 200 is operatively sleeved around the periphery of the first connecting part 112 and the second connecting part 122, and can switch between a locked state and an unlocked state. When the opening 131 needs to be closed, the connecting seat 210 is vertically sleeved over the outer regions of the first connecting part 112 and the second connecting part 122. Leveraging the elastic contraction property of the connecting seat 210, it forms a radially inward constraint on the first connecting part 112 and the second connecting part 122 while applying a tightening force toward each other on the first base part 110 and the second base part 120, thereby preventing unintended separation between the first holding part 111 and the second holding part 121 and effectively blocking the wireless positioning equipment 10 inside the accommodating cavity 130 from falling out through the opening 131 (see FIG. 2). The straight-line annular strap structure combines ease of assembly/disassembly with uniform force distribution, meeting the efficient operational needs for opening 131 closure and release in daily scenarios.

It should be noted that, in the present disclosure, the axial direction refers to the vertical upward extension direction of the joining part 140 from the edges of the first holding part 111 and the second holding part 121 as the reference. Displacement, limiting, or overlapping relationships along this direction are all referred to as "axial" related. The radial direction refers to the horizontal direction perpendicular to the aforementioned axial direction and surrounding the outer periphery of the joining part 140 as the reference. Constraint forces or dimensional relationships along this direction are all referred to as "radial" related.

Figure 6:
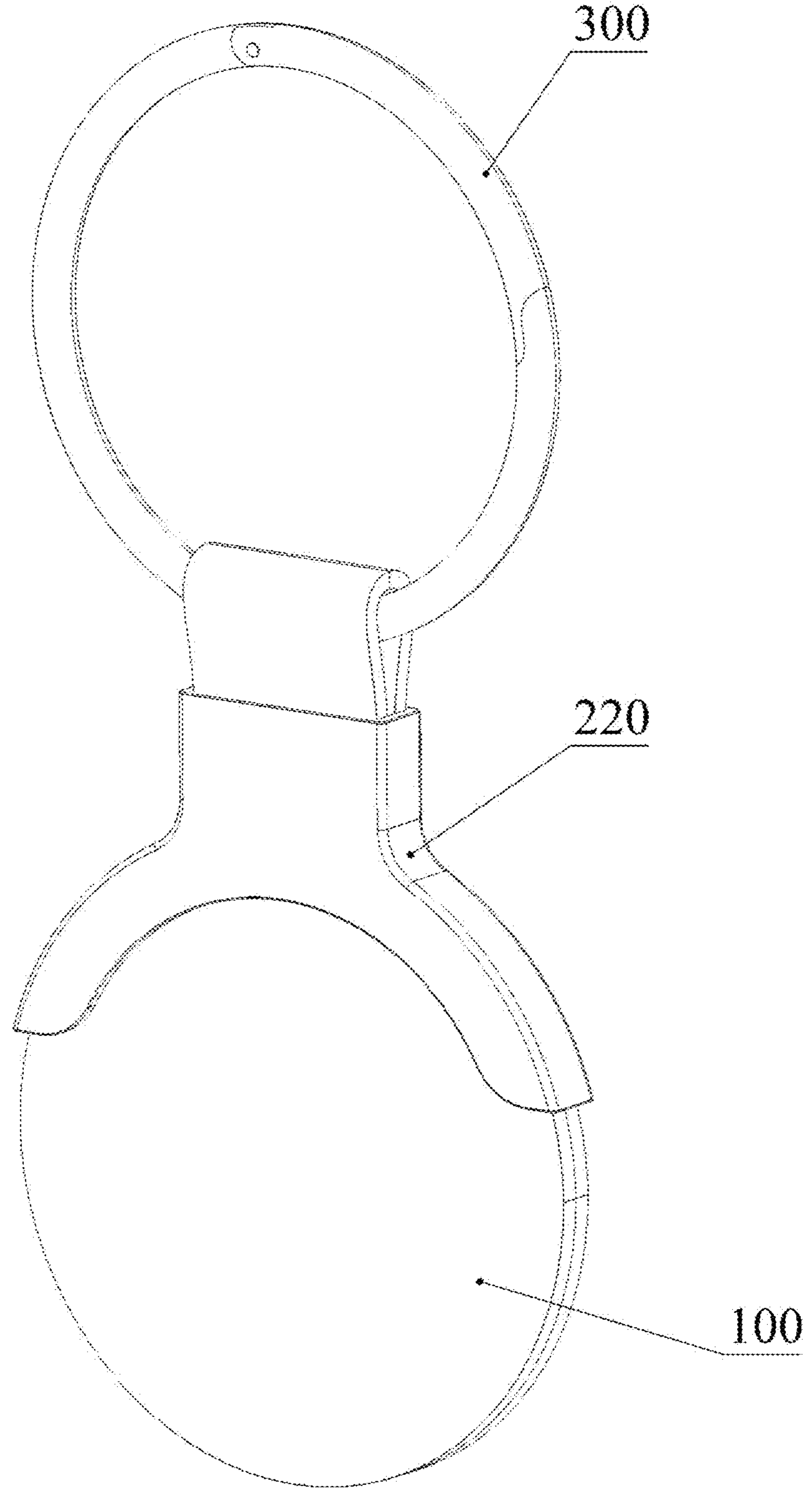
FIG. 6 is a schematic structural diagram of another embodiment provided by the present disclosure.
Figure 7:
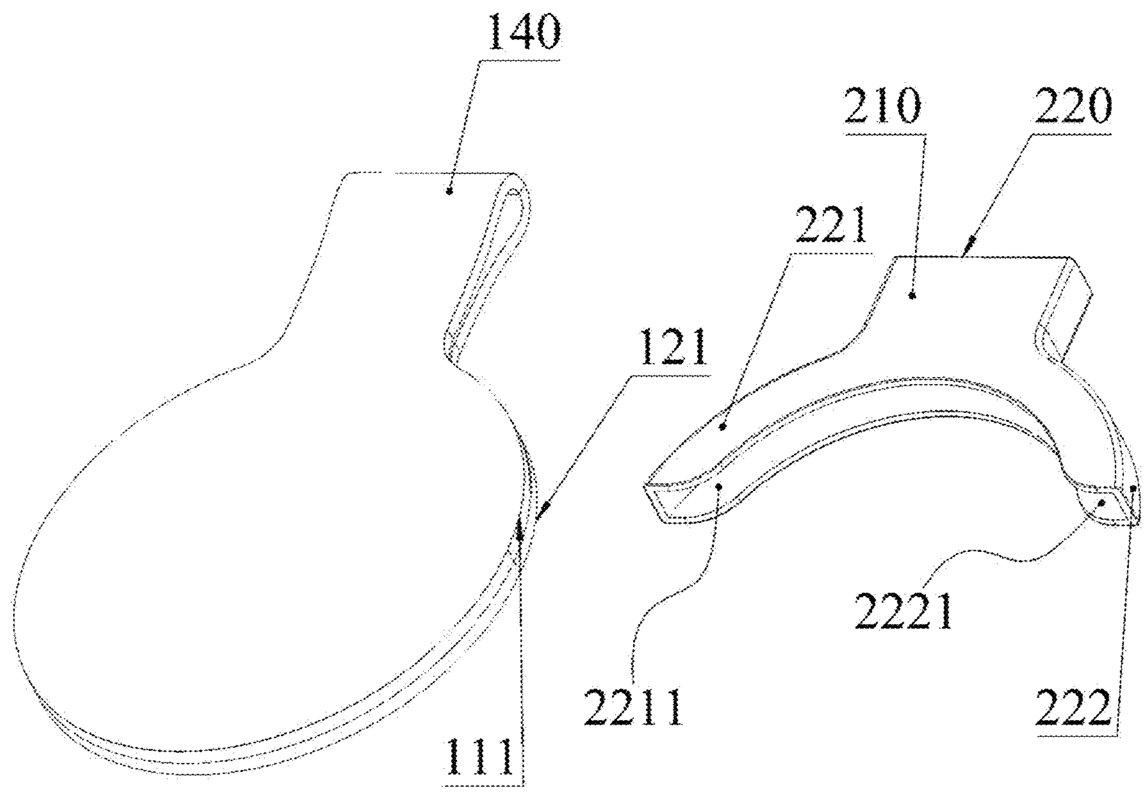
FIG. 7 is an exploded schematic diagram of the embodiment shown in FIG. 6.

In other embodiments of the present disclosure, referring to FIGS. 6 and 7, the locking assembly 200 may also be configured as a herringbone fastener 220. This fastener 220 includes an integrally formed first engaging arm 221, a second engaging arm 222, and a connecting seat 210. Here, the first engaging arm 221 and the second engaging arm 222 extend from the connecting seat 210 along the outer periphery of the opening 131 and are arranged at an angle. This extension path allows the first engaging arm 221 and the second engaging arm 222 to cover and constrain a larger area on both sides of the opening 131. Moreover, the free ends of the first engaging arm 221 and the second engaging arm 222 are each provided with clamping slot structures that match the side profiles of the first holding part 111 and the second holding part 121, namely a first clamping slot 2211 and a second clamping slot 2221. These slots are used to engage the edges of the first holding part 111 and the second holding part 121, limiting the relative separation tendency between them. The connecting seat 210 is a sleeve structure, with its inner peripheral dimensions matching the outer peripheral contour of the joining part 140. The connecting seat 210 can be operatively sleeved over the outer periphery of the first connecting part 112 and the second connecting part 122 and can switch between a locked state and an unlocked state along with the entire fastener 220. In the locked state, it applies a radially inward constraint on the first connecting part 112 and the second connecting part 122, while simultaneously applying a transverse clamping constraint on the first base part 110 and the second base part 120 through the first engaging arm 221 and the second engaging arm 222, further restricting the opening 131 (see FIG. 2) from opening and preventing the wireless positioning equipment 10 from falling out through the opening 131.

When the fastener 220 closes the opening 131, the first engaging arm 221 and the second engaging arm 222 of the fastener 220 are correspondingly engaged with the edges of the first holding part 111 and the second holding part 121, causing portions of the edges of the first holding part 111 and the second holding part 121 to snap into the first clamping slot 2211 and the second clamping slot 2221. Simultaneously, the connecting seat 210 is sleeved over the outer sides of the first connecting part 112 and the second connecting part 122. At this point, the herringbone-arranged first engaging arm 221 and second engaging arm 222 constrain the separation of the first holding part 111 and the second holding part 121 in the lateral dimension. Meanwhile, the connecting seat 210, through its sleeving constraint, forms a circumferential clamping force on the joint between the first connecting part 112 and the second connecting part 122. This ensures that the fastener 220 restricts the relative separation of the first connecting part 112 and the second connecting part 122, as well as the first holding part 111 and the second holding part 121, from both "lateral limiting+circumferential clamping" dimensions, effectively preventing the wireless positioning equipment 10 inside the accommodating cavity 130 from disengaging through the opening 131. Even under external pulling forces, the circumferential constraint of the connecting seat 210 and the lateral support of the engaging arms can synergistically distribute the load, reducing the risk of single-point failure and significantly enhancing the reliability of the opening 131's closure, meeting protection requirements in complex usage scenarios.

In other embodiments (not shown), the locking assembly 200 may also adopt a dual-locking combination mode of "primary locking with auxiliary locking." Specifically, the primary locking retains a straight strap or herringbone fastener, while the auxiliary locking could be an integrated snap or a pull-wire micro clasp, with an additional removable anti-slip sleeve or locking clip installed at the connecting seat 210. The auxiliary locking provides redundant protection in high-vibration or repeated friction scenarios, preventing the positioning equipment from falling due to temporary failure of the primary locking.

Figure 13:
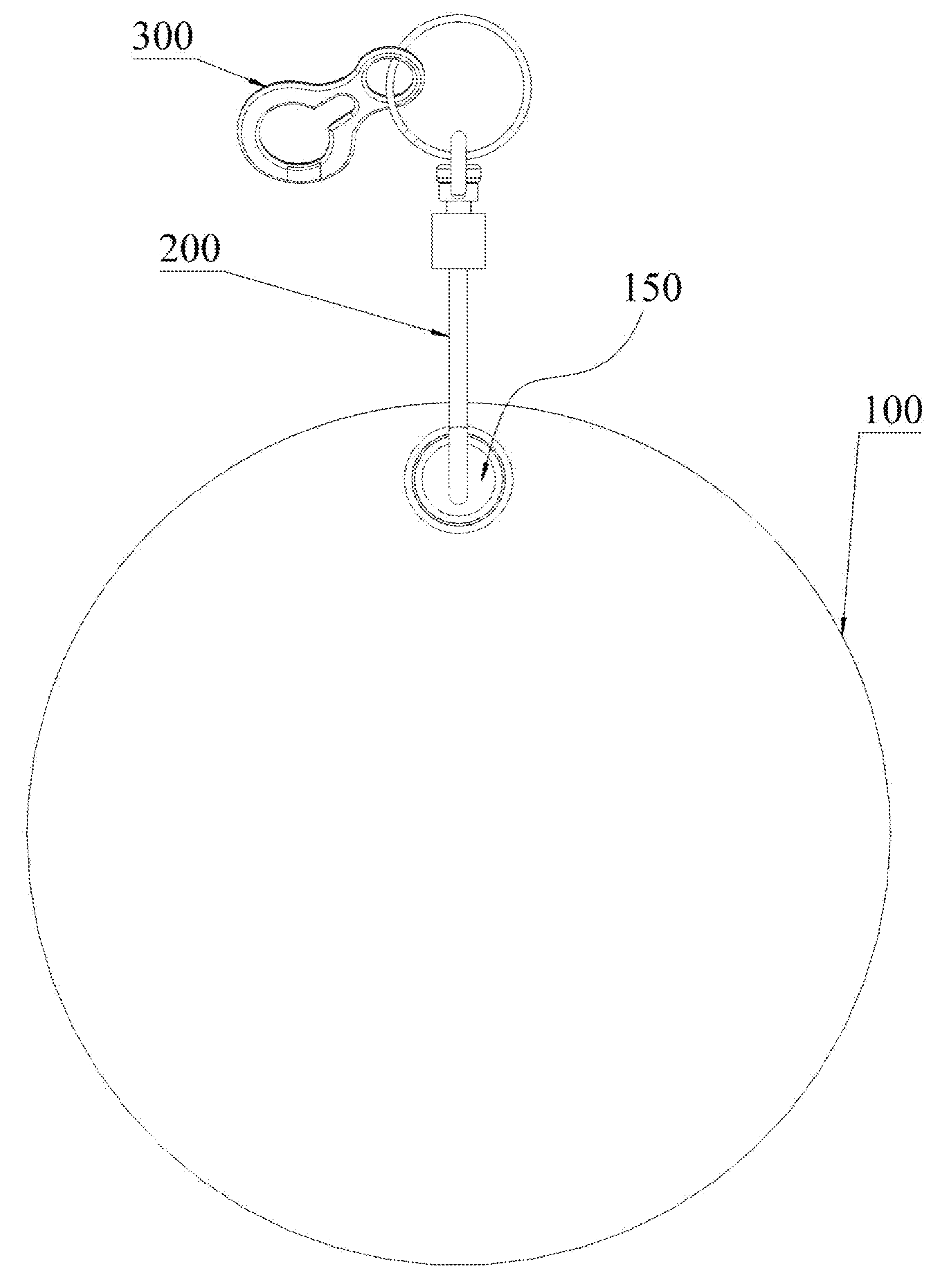
FIG. 13 is a front view of another embodiment of the present disclosure.
Figure 14:
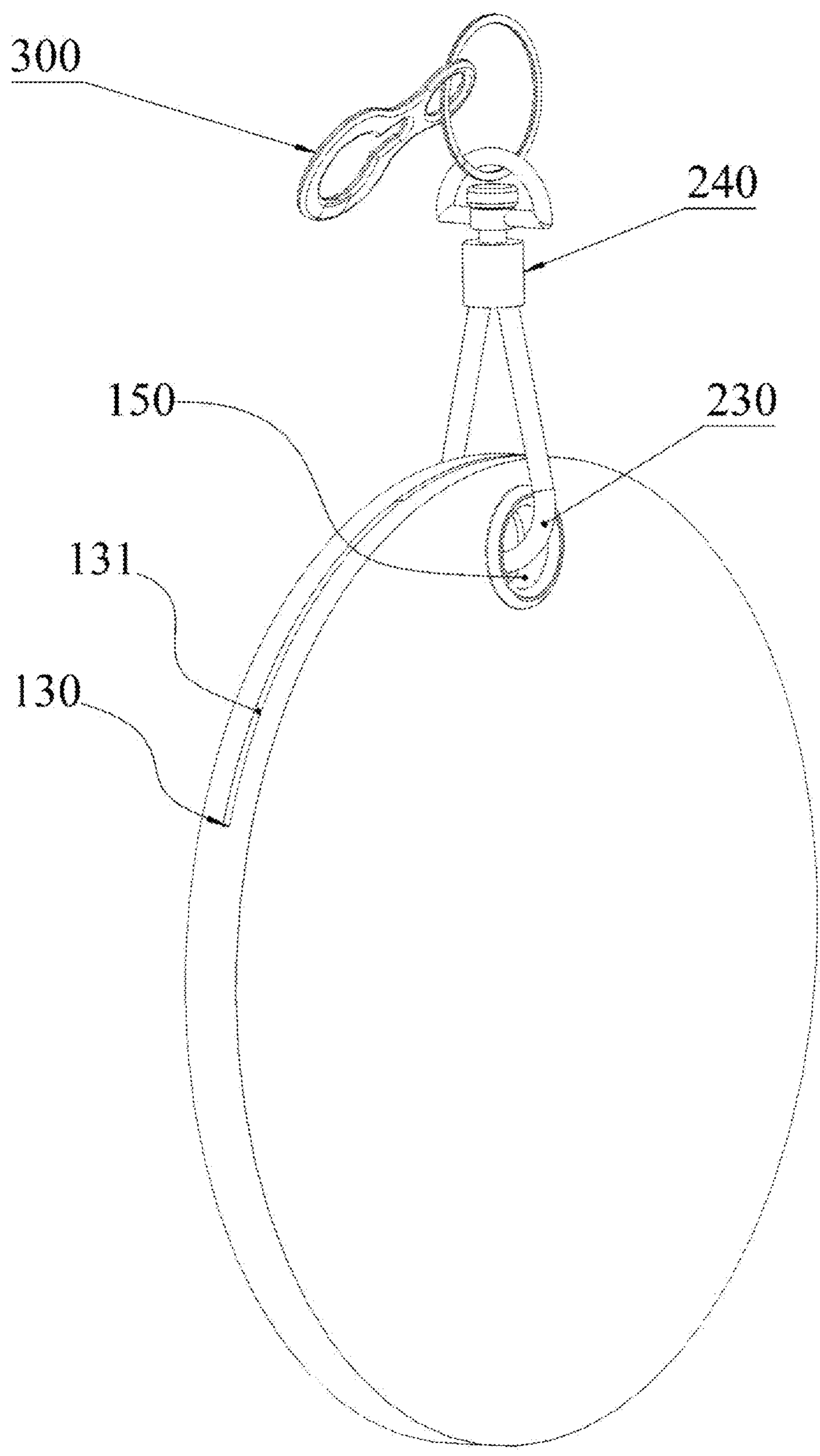
FIG. 14 is a perspective schematic diagram of the embodiment shown in FIG. 13.

In another embodiment of the present disclosure, as shown in FIGS. 13 and 14, the holding component 100 adopts an integrated flexible shell structure. The shell is made of a single flexible material (such as leather, TPU composite fabric, or other materials capable of elastic deformation) and is generally flat and circular in shape. Most of its peripheral edges are sealed to form an accommodating cavity 130 through stitching, thermal fusion, or other fixing methods, with only one side left with an opening 131 for placing the wireless positioning equipment 10. Unlike the aforementioned embodiment with a joining part 140, this embodiment does not require the first holding part 111 and the second holding part 121 to extend upward to form the first connecting part 112 and the second connecting part 122. Instead, the edges on both sides of the opening 131 directly serve as the acting area for the locking assembly 200. Specifically, the holding component 100 is provided with a through hole 150 at the opening 131, through which the locking assembly 200 can operably pass. The locking assembly 200 is configured as a quick-release snap structure, including a connecting shaft 230 that passes through the through hole 150 and a locking latch 240 that cooperates with the connecting shaft 230. When the accommodating cavity 130 needs to be closed, the edges on both sides of the opening 131 are aligned, allowing the connecting shaft 230 to pass through the through hole 150. The locking latch 240 restricts the axial displacement of the connecting shaft 230 through its own snapping or elastic locking function, thereby drawing together and fixing the edges on both sides of the opening 131, keeping the accommodating cavity 130 in a closed state and reliably securing the wireless positioning equipment 10 inside. If the opening 131 needs to be opened, operating the locking latch 240 to release the restriction on the connecting shaft 230 allows the connecting shaft 230 to be pulled out from the opening 131, and the opening 131 can then be widened for easy access to the wireless positioning equipment 10. This structure ensures the stability of the accommodating cavity 130 after closure while offering operational convenience.

In other embodiments, for industrial or extreme environment applications, the holding component 100 can also be made of high-temperature-resistant silicone rubber or fluororubber material, with a metal fabric reinforcement layer introduced in the middle layer to enhance corrosion resistance and anti-aging performance. Meanwhile, the connecting seat 210 of the locking assembly 200 can be made of glass fiber-reinforced polymer to maintain shape stability. This embodiment is suitable for high-temperature, chemically corrosive, or long-term sun-exposed usage environments.

Figure 8:
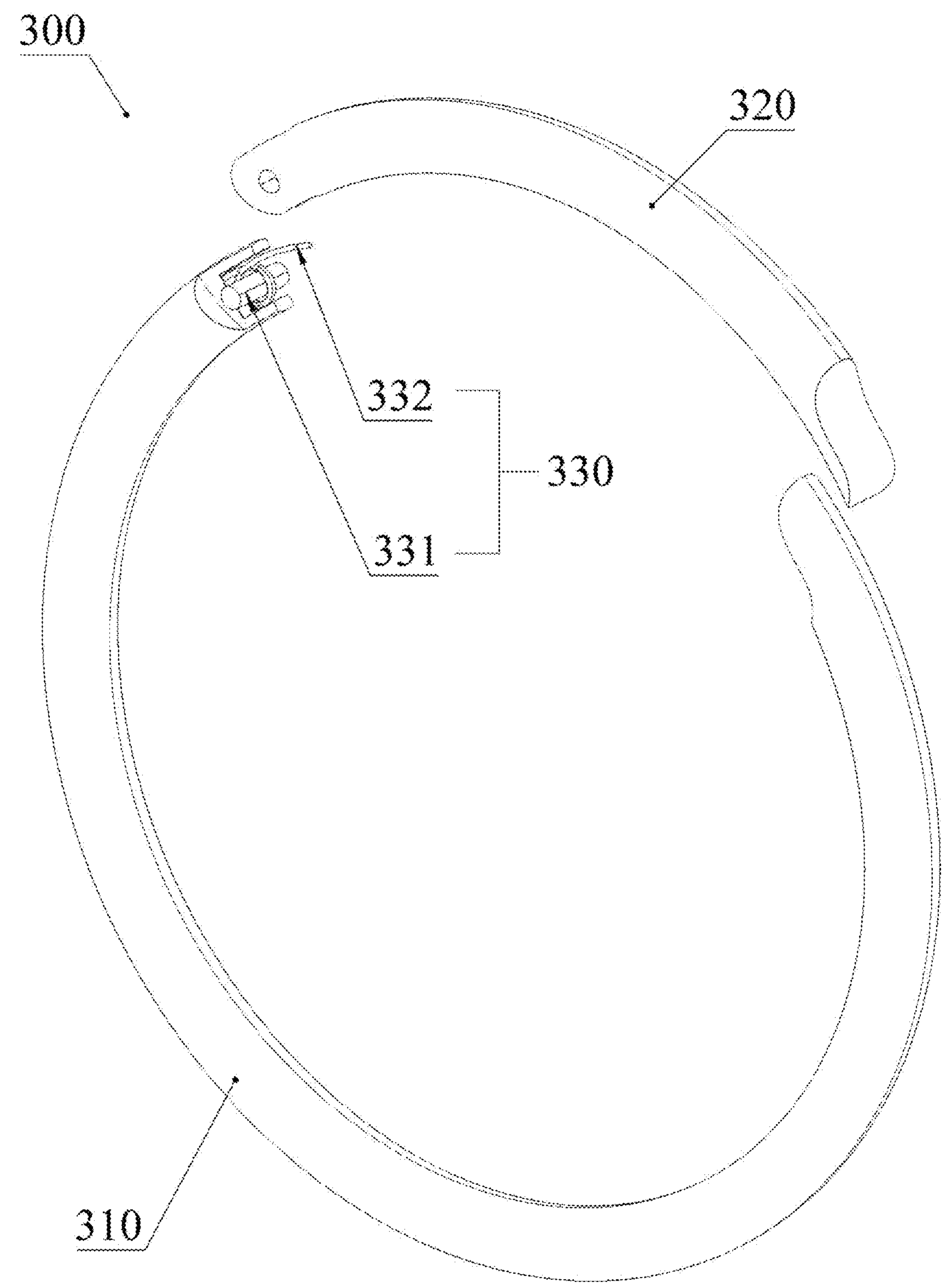
FIG. 8 is an exploded schematic diagram of the hanging assembly of the embodiment shown in FIG. 1.
Figure 9:
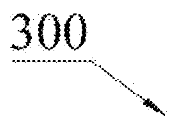
FIG. 9 is another perspective schematic diagram of the embodiment shown in FIG. 8.
Figure 9:
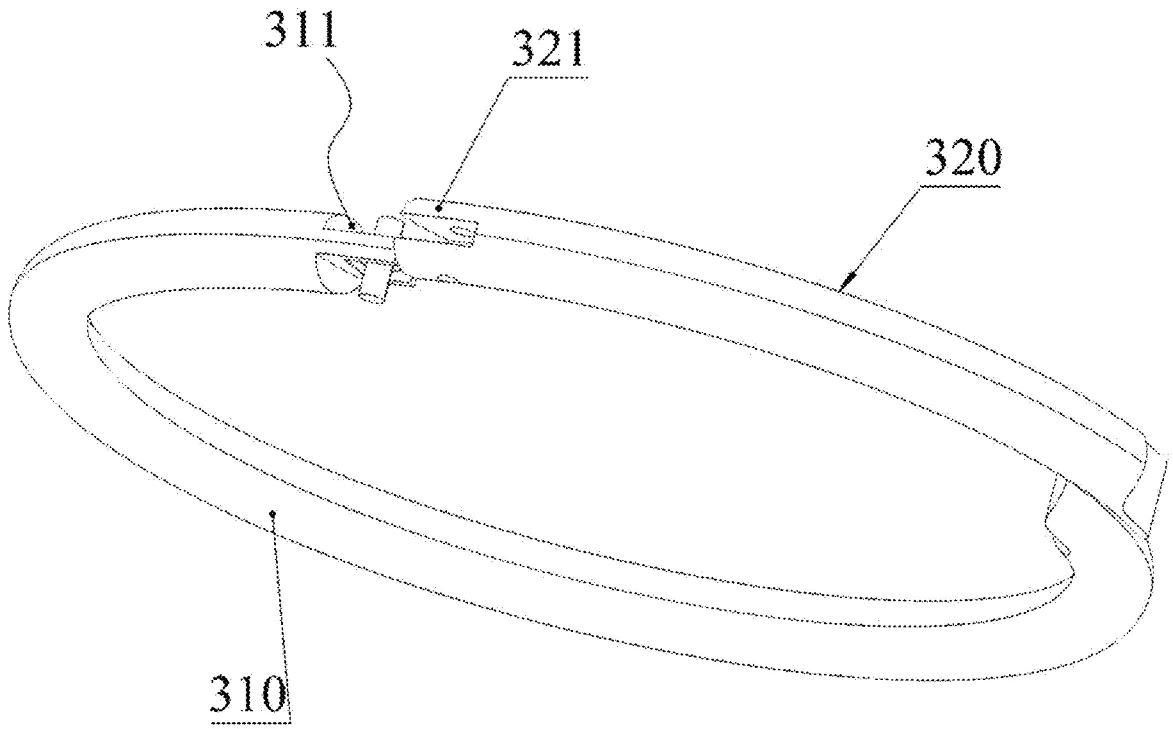

As shown in FIGS. 8 and 9, the protective device for wireless positioning equipment of the present disclosure may further include a hanging assembly 300, preferably a ring-shaped hook buckle structure, including a fixed segment 310 and a press-to-open movable segment 320. A locking mechanism 330 is provided at the joining part of the fixed segment 310 and the movable segment 320, which includes a hinge shaft 331 and a torsion spring 332. The movable segment 320 is rotatably connected to the fixed segment 310 via the hinge shaft 331, and the torsion spring 332 is sleeved on the hinge shaft 331, with its two ends abutting the fixed segment 310 and the movable segment 320 respectively, providing an elastic reset force to the movable segment 320 toward the fixed segment 310. The end of the fixed segment 310 is provided with a locking recess 311, while the end of the movable segment is equipped with a locking protrusion 321 that matches the contour of the locking recess 311. When the movable segment 320 is pressed, it rotates around the hinge shaft 331 against the elastic force of the torsion spring 332, causing the locking protrusion 321 to disengage from the locking recess 311, forming an opening in the hook buckle for hanging operations. Upon releasing the movable segment 320, under the elastic reset force of the torsion spring 332, the movable segment 320 swings back, and the locking protrusion 321 re-engages with the locking recess 311, closing the fixed segment 310 and the movable segment 320 into a complete ring, thereby preventing accidental detachment of the hanging assembly 300 and ensuring the suspension reliability of the protective device for wireless positioning equipment.

Figure 11:
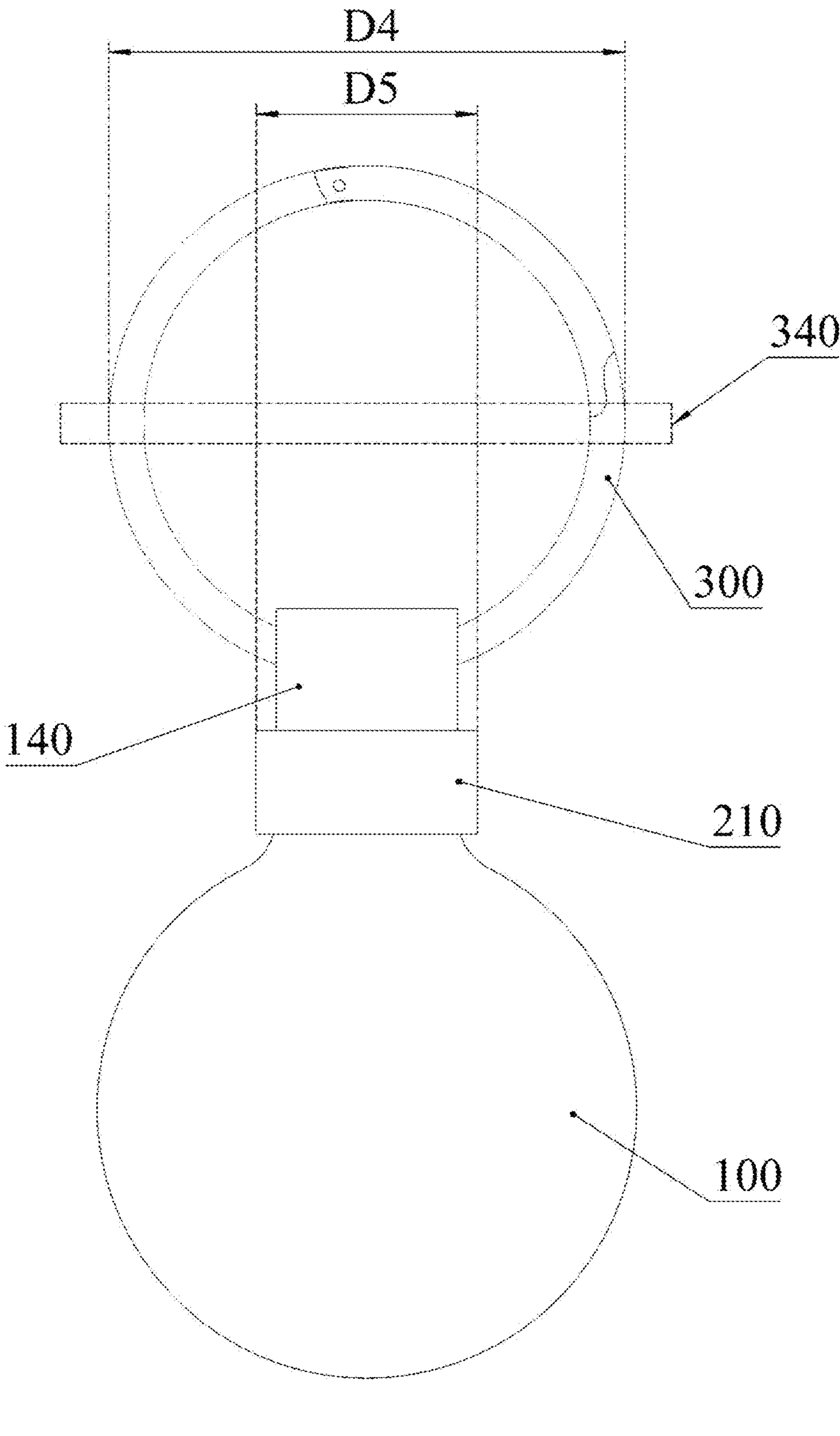
FIG. 11 is a front view of the embodiment shown in FIG. 1.
Figure 12:
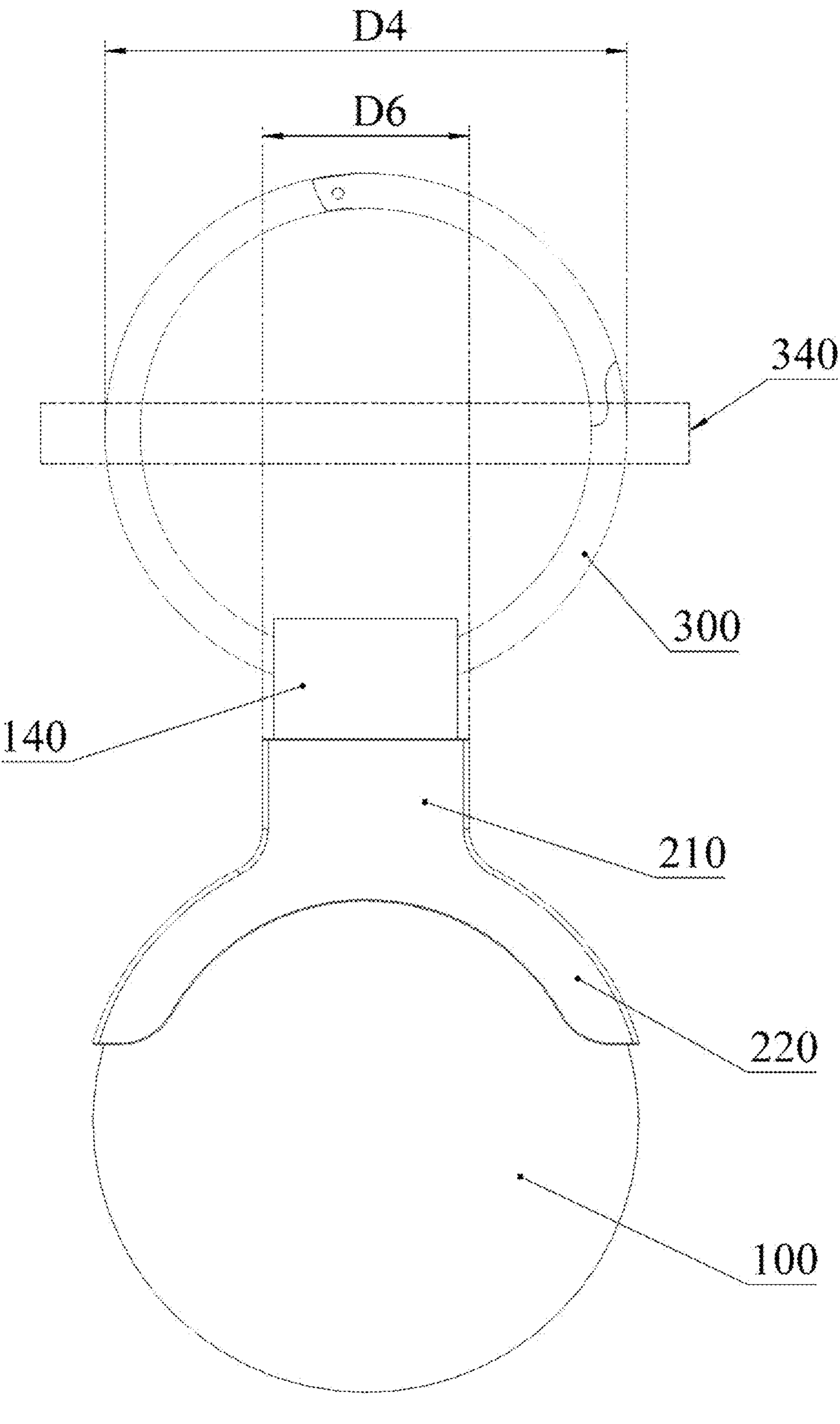
FIG. 12 is a front view of the embodiment shown in FIG. 6.

As shown in FIGS. 11 and 12, the hanging assembly 300 further includes a limiting portion 340, which fully overlaps axially with the locking assembly 200 (the main area of the connecting seat 210) to prevent the locking assembly 200 from accidentally detaching from the joining part 140. Specifically, the maximum outer diameter D4 of the ring body of the hanging assembly 300 is greater than the maximum outer diameter D5 of the connecting seat 210 or the maximum outer diameter D6 of the connecting seat 210. When the hanging assembly 300 is connected to the joining part 140 of the holding component 100, its wider dimensional characteristics enable it to form an axial limiting constraint on the locking assembly 200, effectively blocking unintended axial displacement of the locking assembly 200 along the joining part 140. This further strengthens the stability of the connection between the components of the protective device, preventing failure of the opening closure due to detachment of the locking assembly 200 and ensuring that the wireless positioning equipment 10 remains in a reliably protected state.

In embodiments where the holding component 100 of the present disclosure lacks a connecting part, as shown in FIGS. 13 and 14, the hanging assembly 300 can operably engage with the locking assembly 200. Specifically, the hanging assembly 300 adopts the aforementioned annular hook buckle structure, including a fixed segment 310 and a press-to-open movable segment 320. The fixed segment 310 and the movable segment 320 are rotationally connected via a hinge shaft 331, with a torsion spring 332 sleeved on the hinge shaft 331 to provide elastic reset force. The locking recess 311 at the end of the fixed segment 310 mates with the locking protrusion 321 at the end of the movable segment 320. Pressing the movable segment 320 enables the hook buckle to open or close, allowing the hanging assembly 300 to be suspended onto or removed from the locking assembly 200. Upon release, it automatically closes to prevent accidental detachment. The hanging assembly 300 achieves its hanging function through its own structure—capable of being attached to items like keychains or backpack loops—enabling portable carrying of the protective device.

In summary, the present disclosure achieves the following technical effects: The holding component 100 forms an enclosed accommodating cavity 130 by stitching the first base part 110 and the second base part 120 and designing the joining part 140, providing a stable space for wireless positioning equipment. In the locking assembly 200, the linear annular strap, leveraging the contraction properties of elastic and wear-resistant material, enables "quick installation/removal+uniform circumferential clamping" for closing the opening 131, adapting to efficient daily operations. The herringbone fastener establishes a multi-dimensional constraint mechanism through "lateral clamping slot limitation of the first/second engaging arms+circumferential sleeving and clamping of the connecting seat," dispersing external loads and significantly enhancing the reliability of opening closure in complex scenarios, effectively preventing the wireless positioning equipment 10 from escaping through the opening. The hanging assembly 300, on one hand, relies on the coordination of the "fixed segment+pressable movable segment+locking mechanism (hinge shaft, torsion spring, locking recess/protrusion)" to achieve efficient "press-to-hang, release-to-lock" operation, ensuring the device's own hanging reliability. On the other hand, its larger-diameter annular body forms axial limitation for the locking assembly 200, preventing unintended detachment along the joining part 140, further strengthening the connection stability of all components and avoiding failure of opening closure.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A protective device for wireless positioning equipment, comprising:

a holding component, comprising a first base part and a second base part, wherein part of edges of the first base part and part of edges of the second base part are interconnected to jointly enclose to form an accommodating cavity for holding wireless positioning equipment, and an unconnected part of the edges of the first base part and an unconnected part of the edges of the second base part form an opening leading to the accommodating cavity;

a locking assembly operatively disposed adjacent to the opening and switchable between a locked state and an unlocked state, wherein in the locked state, the locking assembly prevents the positioning equipment from disengaging from the accommodating cavity;

the first base part comprises a first holding part and a first connecting part, and the second base part comprises a second holding part and a second connecting part; and the locking assembly is provided with a connecting seat operatively disposed around the first connecting part and the second connecting part; and the connecting seat applies a radially inward constraint to the first connecting part and the second connecting part to limit relative separation of the first holding part and the second holding part, thereby preventing the positioning equipment from disengaging from the accommodating cavity.

2. The protective device for wireless positioning equipment according to claim 1, wherein the first connecting part and the second connecting part extend upward from edges of the first holding part and the second holding part along the opening respectively, and are fixedly connected at one end to form a joining part.

3. The protective device for wireless positioning equipment according to claim 2, wherein a part of edges of the first holding part and a part of edges of the second holding part is joined to form the accommodating cavity, and an unjoined part of the edges of the first holding part and an unjoined part of the edges of the second holding part forms the opening leading to the accommodating cavity.

4. The protective device for wireless positioning equipment according to claim 3, wherein 20% of a diameter of the wireless positioning equipment is less than a distance between two outer end points of the opening.

5. The protective device for wireless positioning equipment according to claim 4, wherein the distance between the two outer end points of the opening is less than a maximum linear dimension of the first base part and the second base part.

6. The protective device for wireless positioning equipment according to claim 2, wherein the locking assembly is provided with a connecting seat and at least one engaging arm extending from the connecting seat, and the connecting seat is operatively arranged around the first connecting part and the second connecting part.

7. The protective device for wireless positioning equipment according to claim 6, wherein the locking assembly comprises a first engaging arm and a second engaging arm that extend from the connecting seat along an outer periphery of the opening.

8. The protective device for wireless positioning equipment according to claim 7, wherein the first engaging arm is provided with a first clamping slot, the second engaging arm is provided with a second clamping slot, and the first clamping slot and the second clamping slot are configured to engage edges of the holding component.

9. The protective device for wireless positioning equipment according to claim 8, wherein the connecting seat applies a radially inward constraint to the first connecting part and the second connecting part, and the first engaging arm and the second engaging arm form a limiting effect on relative separation tendency of the first holding part and the second holding part, working together to prevent the positioning equipment from disengaging from the accommodating cavity.

10. The protective device for wireless positioning equipment according to claim 2, further comprising a hanging assembly, wherein the hanging assembly is configured as a hook buckle and is connected to the joining part of the holding component.

11. The protective device for wireless positioning equipment according to claim 10, wherein the hanging assembly comprises a limiting portion that axially overlaps with the locking assembly when the hanging assembly is connected to the joining part.

12. The protective device for wireless positioning equipment according to claim 1, wherein the holding component is provided with a through hole adjacent to the opening.

13. The protective device for wireless positioning equipment according to claim 12, wherein the locking assembly is operatively passed through the through hole of the holding component.

14. The protective device for wireless positioning equipment according to claim 13, further comprising a hanging assembly, wherein the hanging assembly is operatively combined with the locking assembly.

15. The protective device for wireless positioning equipment according to claim 1, wherein the first holding part and the second holding part jointly enclose to form the accommodating cavity.

16. The protective device for wireless positioning equipment according to claim 1, wherein the first base part and the second base part are configured to undergo elastic deformation under external force, allowing the wireless positioning equipment to be placed into the accommodating cavity through the opening, and at least partially restore original shapes of the first base part and the second base part after the external force is removed.

17. A protective device for wireless positioning equipment, comprising:

a holding component, comprising a first base part and a second base part, wherein part of edges of the first base part and part of edges of the second base part are interconnected to jointly enclose to form an accommodating cavity for holding wireless positioning equipment, and an unconnected part of the edges of the first base part and an unconnected part of the edges of the second base part form an opening leading to the accommodating cavity;

a locking assembly operatively disposed adjacent to the opening and switchable between a locked state and an unlocked state, wherein in the locked state, the locking assembly prevents the positioning equipment from disengaging from the accommodating cavity;

wherein the first base part comprises a first holding part and a first connecting part, and the second base part comprises a second holding part and a second connecting part;

wherein the first connecting part and the second connecting part extend upward from edges of the first holding part and the second holding part along the opening respectively, and are fixedly connected at one end to form a joining part; and wherein the locking assembly is provided with a connecting seat operatively disposed around the first connecting part and the second connecting part.

18. The protective device for wireless positioning equipment according to claim 17, wherein an outer diameter of the connecting seat is less than a maximum outer diameter of the holding component.

19. The protective device for wireless positioning equipment according to claim 17, wherein the connecting seat applies a radially inward constraint to the first connecting part and the second connecting part to limit relative separation of the first holding part and the second holding part, thereby preventing the positioning equipment from disengaging from the accommodating cavity.

* * * * *